(12) United States Patent
Santucci (10) Patent No.: US 9,510,523 B2
(45) Date of Patent: Dec. 6, 2016

(54) PORTABLE DIRECTIONAL TREE FELLER

(71) Applicant: Guy Santucci, Destin, FL (US)

(72) Inventor: Guy Santucci, Destin, FL (US)

( * ) Notice: Subject to any disclaimer, the term of this patent is extended or adjusted under 35 U.S.C. 154(b) by 938 days.

(21) Appl. No.: 13/831,552

(22) Filed: Mar. 14, 2013

(65) Prior Publication Data

US 2013/0240086 A1    Sep. 19, 2013

Related U.S. Application Data

(60) Provisional application No. 61/610,747, filed on Mar. 14, 2012.

(51) Int. Cl.
*B27B 17/00*    (2006.01)
*A01G 23/099*    (2006.01)

(52) U.S. Cl.
CPC .................................. *A01G 23/099* (2013.01)

(58) Field of Classification Search
CPC ...... B25B 1/205; B25B 13/14; B23K 37/0533
See application file for complete search history.

(56) References Cited

U.S. PATENT DOCUMENTS

| | | | | |
|---|---|---|---|---|
| 3,661,378 | A * | 5/1972 | Dodge | B25B 1/205 269/131 |
| 4,986,043 | A * | 1/1991 | Love | E04G 21/26 269/131 |
| 8,777,205 | B2 * | 7/2014 | Hamm | B25B 1/205 269/130 |
| 2009/0013835 | A1 * | 1/2009 | Kidd | B21D 39/046 81/423 |
| 2013/0240086 | A1 * | 9/2013 | Santucci | A01G 23/099 144/34.1 |
| 2013/0328257 | A1 * | 12/2013 | Martin | B25B 1/205 269/97 |

* cited by examiner

*Primary Examiner* — Lee D Wilson (57) ABSTRACT

A portable directional tree feller is an apparatus used to brace a tree that is being felled and to control it is lowered to the ground. The apparatus comprises a trunk cradle, a notch hinge, a stump cradle, an actuator, a counterfort, and a ground support. The trunk cradle braces the cut portion of a felled tree, and the stump cradle braces the rooted portion of the felled tree. The trunk cradle is pivotally connected to the stump cradle by the notch hinge. The ground support is used to brace the apparatus against the ground and is perpendicularly connected the stump cradle. The counterfort is used to buttress the right angle created between the ground support and the stump cradle. The actuator is pivotally connected to both the ground support and the trunk brace and provides the mechanical power to raise and lower the cut portion with trunk brace.

19 Claims, 12 Drawing Sheets

PORTABLE DIRECTIONAL TREE FELLER

The current application claims a priority to the U.S. Provisional Patent application Ser. No. 61/610,747 filed on Mar. 14, 2012.

FIELD OF THE INVENTION

The present invention relates generally to an apparatus for a hydraulic jack. More specifically, the present invention is a hydraulic jack for lowering a tree safely after it has been cut down.

BACKGROUND OF THE INVENTION

Traditionally, the process of felling a tree has been without a secure and controllable method to lower the disconnected, felled portion of the tree safely to the ground. A feller often allows the felled portion of the tree to freely fall to the ground. Rope-like devices have been used to partially dissipate the energy as the disconnected portion of the tree would fall. This would be done by securing the rope-like devices to the tree in order to maintain a desired tension as it would be lowered. However, this only allows minimum control for the disconnected portion of the tree is not rigidly connected to any structure. Without a rigid connection to a support structure, the disconnected portion of the tree could sway, slip or behave unpredictably. Also, such methods or similar methods to lower a felled tree commonly disregard the environment surrounding the felled tree. Buildings, shrubbery, existing groundcover and anything adjacent to the embodiment of the tree have the potential to be damaged as the felled tree lowers to the ground. It is the objective of the present invention to create an apparatus that can lower felled trees easily and safely to a desired location on the ground with as much control over the felled tree as possible. The present invention therefore allows a felled tree to be lowered safely to a desired location on the ground without damaging any objects that are adjacent to the embodiment of the tree.

DETAIL DESCRIPTIONS OF THE INVENTION

All illustrations of the drawings are for the purpose of describing selected versions of the present invention and are not intended to limit the scope of the present invention.

Figure 1:
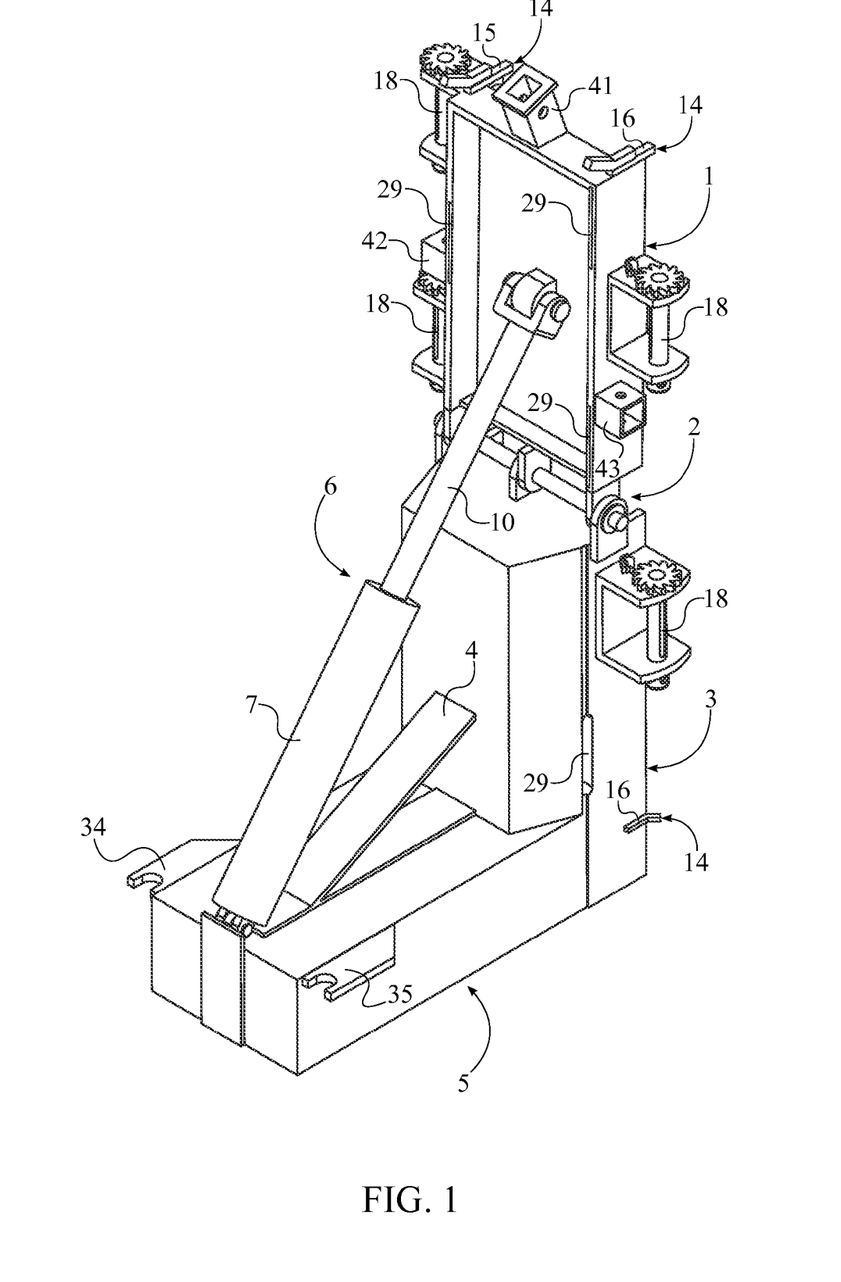
FIG. 1 is a back perspective view of the present invention.
Figure 9:
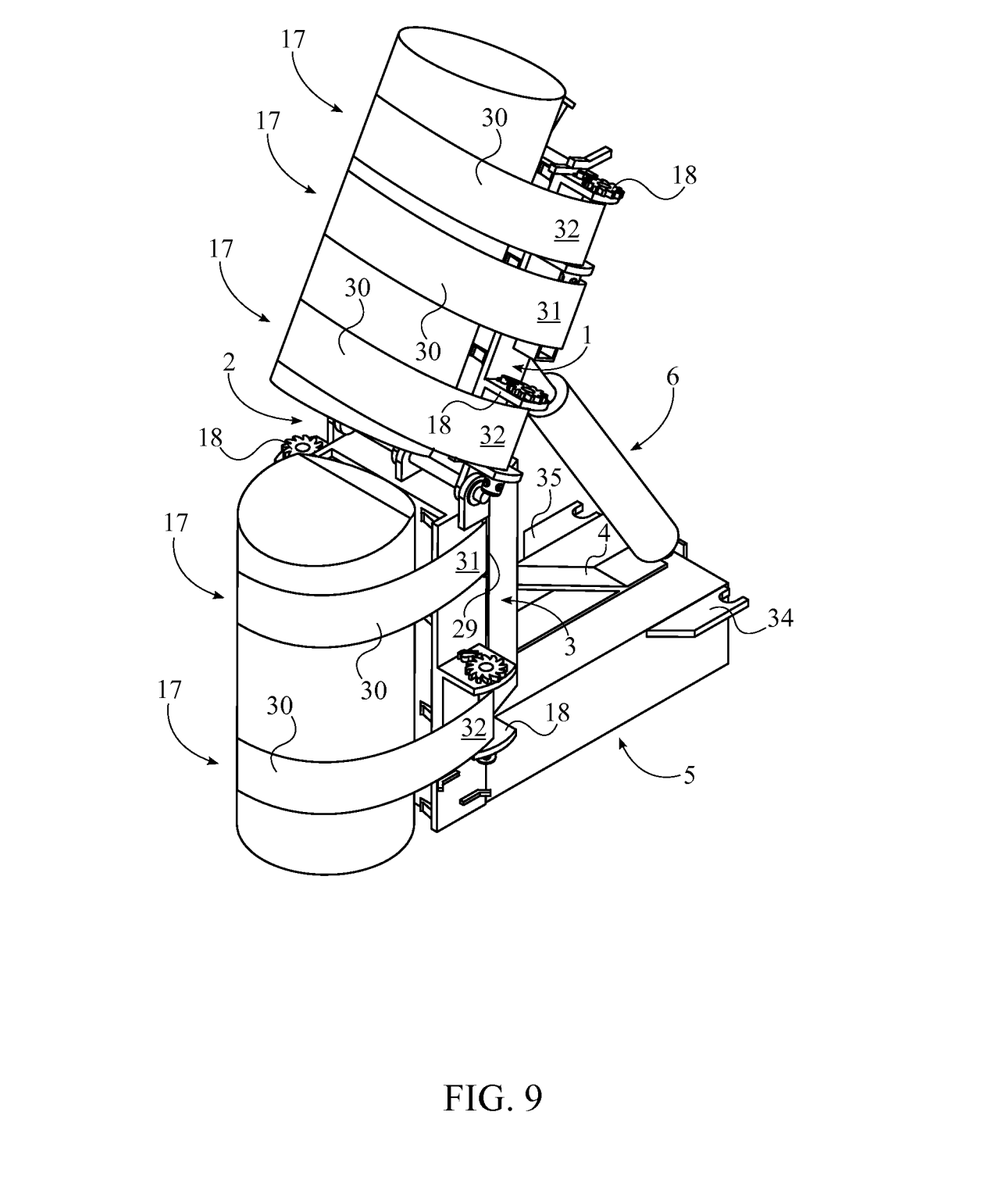
FIG. 9 is a perspective view of the present invention breaking a felled tree.

As can be seen in FIGS. 1 and 9, the present invention is a portable directional tree feller, which is used to control the direction and rate at which a felled tree is lowered to the ground. The present invention has the capability to direct the motion of a felled tree as it is lowered. It is necessary to direct the motion because the weight and size of a tree typically will be much greater than the weight and size of the embodiment of the present invention. Without the use of the present invention, the felled tree could behave erratically as it is lowered and could move in an unpredicted path. The present invention mainly comprises a trunk cradle 1, a notch hinge 2, a stump cradle 3, an at least one counterfort 4, a ground support 5, an actuator 6, a plurality of tree cleats 13, a plurality of brackets 14, a plurality of securing assemblies 17, a positioning mechanism 33, a top square hitch 41, a left square hitch 42, and a right square hitch 43. A felled tree will break into two portions. The present invention will brace the rooted portion of the felled tree with the stump cradle 3, and the present invention will brace the cut portion of the felled tree with the trunk cradle 1. The notch hinge 2 is used to direct the movement of the felled tree so that the cut portion safely falls to the ground. The actuator 6 is used to slow the movement of the felled tree so that the cut portion is lowered to the ground in a controlled manner. The actuator 6 can also stop the movement of felled tree at different elevations so that the branches can be sawed off the cut portion before the cut portion hits the ground. The ground support 5 is used to brace the present invention against the ground, and the at least one counterfort 4 is used to further brace the present invention against the ground. The positioning mechanism 33 is used to move the present invention closer towards the felled tree so that the stump cradle 3 can securely brace the rooted portion and the trunk cradle 1 can securely brace the cut portion. The plurality of brackets 14 improves the ability of the trunk cradle 1 and the stump cradle 3 to brace the felled tree. The plurality of securing assemblies 17 binds the stump cradle 3 to the rooted portion and the binds the trunk cradle 1 to cut portion. The plurality of tree cleats 13 prevents slippage between the stump cradle 3 and the rooted portion and prevents slippage between the trunk cradle 1 and the cut portion. The top square hitch 41, the left square hitch 42, and the right square hitch 43 allow the present invention to be connected to a stump grinder and allow the present invention to be carried by the stump grinder.

Figure 2:
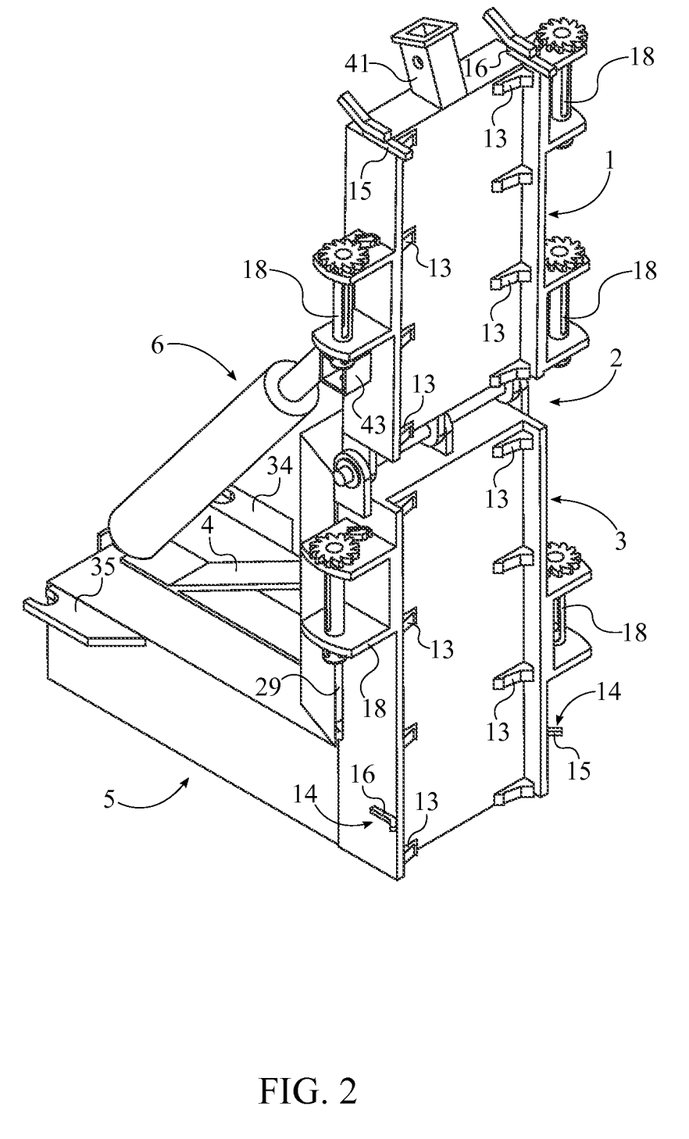
FIG. 2 is a front perspective view of the present invention with the trunk brace straightened.
Figure 3:
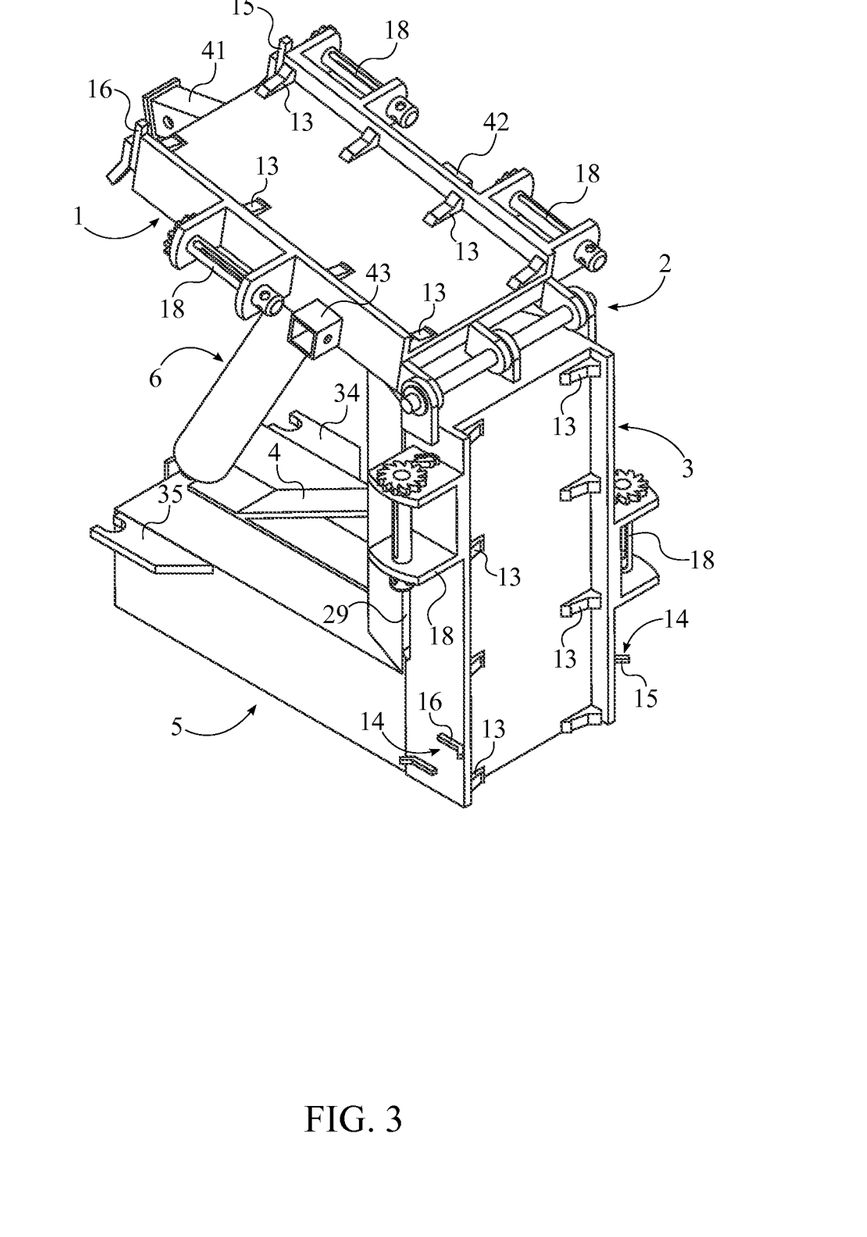
FIG. 3 is a front perspective view of the present invention with the trunk brace bent away from the stump brace.

The configuration of the present invention's structural components is essential for lowering the felled tree in a controlled manner and is shown in FIGS. 2 and 3. The trunk cradle 1 is adjacently positioned to the stump cradle 3. The trunk cradle 1 is also pivotally connected to the stump cradle 3 by the notch hinge 2 so that the notch hinge 2 is positioned in between the trunk cradle 1 and the stump cradle 3. The configuration of the trunk cradle 1, the stump cradle 3, and the notch hinge 2 act as a mechanical brace to guide the movement of the felled tree. Consequently, a cut is made into the felled tree adjacent to the notch hinge 2 so that the felled tree breaks into the rooted portion and the cut portion at the notch hinge 2. The ground support 5 allows the ground to structurally support the stump cradle 3 so that the movement of the felled tree is guided only by the notch hinge 2 and actuator 6. In order to be properly positioned on the ground, the ground support 5 is adjacently positioned to the stump cradle 3 opposite to the trunk brace and is perpendicularly connected to the stump cradle 3. The trunk cradle 1, the stump cradle 3, and the ground support 5 are reinforced steel beams in the preferred embodiment of the present invention. The at least one counterfort 4 buttresses the right angle that is created between the trunk cradle 1 and the ground support 5. Thus, the at least one counterfort 4 is diagonally connected between the stump cradle 3 and the ground support 5. In the preferred embodiment, the at least one counterfort 4 is a rigid diagonal beam between the trunk cradle 1 and the ground support 5, but the at least one counterfort 4 could also be other kinds of supporting devices such as a chain. The actuator 6 is used to support the weight of the cut portion for the felled tree as the cut portion is lowered to the ground by the present invention. Thus, the actuator 6 is diagonally positioned between the trunk cradle 1 and the ground support 5. In the preferred embodiment, the actuator 6 is a hydraulic ram that is coupled to a hydraulic power plant, but the actuator 6 could be other hydraulic devices such as a bottle jack or a two stage hydraulic ram. Hydraulic technology that is used for the present invention should have the load bearing capacity to withstand the load from the weight of the cut portion of a tree.

Figure 6:
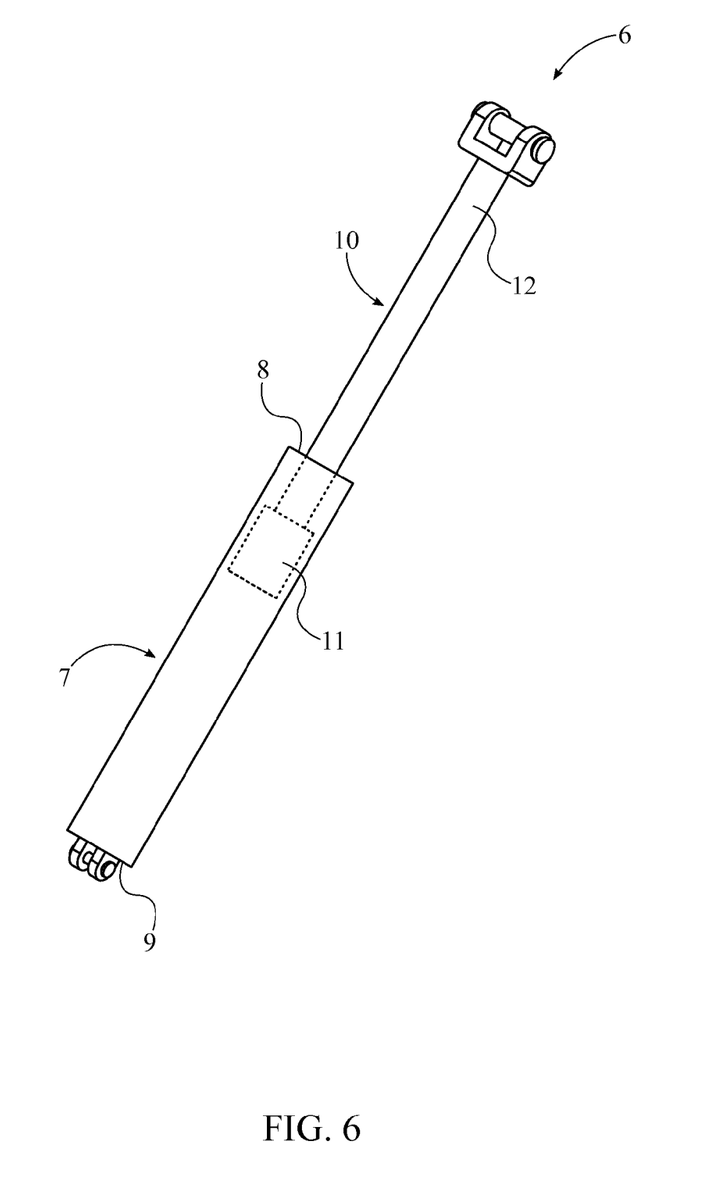
FIG. 6 is a perspective view of the actuator for the present invention.

In reference to FIG. 6, the actuator 6 is connected to the present invention in specific manner that allows the actuator 6 to change orientation as the cut portion is lowered to the ground. The actuator 6 comprises a piston 10 and a chamber 7. The chamber 7 is used to convert potential energy into mechanical energy, which allows the chamber 7 to drive the linear motion of the piston 10. The chamber 7 comprises an open end 8 and a closed end 9, which are positioned opposite to each other along the chamber 7. The closed end 9 is pivotally connected to the ground support 5 opposite to the stump cradle 3. The piston 10 comprises a head 11 and a shaft 12. The head 11 allows the chamber 7 to apply the mechanical energy on the piston 10. The shaft 12 allows the piston 10 to extend the application of the mechanical energy away from the head 11. The shaft 12 is connected normal to the head 11 and is centrally positioned with the head 11. The trunk cradle 1 is pivotally connected to the shaft 12 opposite to said head 11. Consequently, the mechanical energy from the chamber 7 is applied to the trunk cradle 1 by the shaft 12 and can be used to slow the falling rate of the cut portion or to hold up the cut portion.

Certain components are used to properly grasp the felled tree to the present invention and are shown in FIGS. 1, 2, 3, and 9. In order to describe the orientation and positioning of the components, the trunk cradle 1 and the stump cradle 3 must be defined together as a tree bearing structure. Thus, the plurality of securing assemblies 17 is evenly distributed along the tree bearing structure so that the stump cradle 3 can properly bind to the rooted portion of the felled tree and the trunk cradle 1 can properly bind to cut portion of the felled tree. In addition, the plurality of brackets 14 is evenly distributed along the tree bearing structure so that the stump cradle 3 can further brace the rooted portion of the felled tree and the trunk cradle 1 can further brace the cut portion of the felled tree. The plurality of tree cleats 13 is adjacently connected across the tree bearing structure and are positioned opposite to the ground support 5, the at least one counterfort 4, and the actuator 6. The plurality of tree cleats 13 allows the tree bearing structure to grip the felled tree by digging into the outer surface of the felled tree.

As can be seen in FIG. 9, the plurality of securing assemblies 17 firmly attaches the present invention to the felled tree so that the trunk cradle 1 and the stump cradle 3 can precisely control the lowering of the felled tree. In the preferred embodiment of the present invention, each of the plurality of securing assemblies 17 uses a winch 18, a ledge 29, and a strap 30. For each securing assembly, the strap 30 connects to one side of the tree bearing structure, travels around the felled tree, and connects to the other side of the tree bearing structure. The strap 30 is the actual means of binding the rooted portion to the stump cradle 3 or the cut portion to the trunk cradle 1. The strap 30 comprises a first end 31 and a second end 32, which are positioned opposite to each other along the strap 30. The first end 31 engages the ledge 29, which is adjacently positioned into the tree bearing structure. The ledge 29 is a means for the first end 31 of the strap 30 to grip the tree bearing structure. For example, the ledge 29 could be an indented portion of the tree bearing structure or a recessed space located on the tree bearing structure. The second end 32 engages the winch 18, which is adjacently connected to the tree bearing structure opposite to the ledge 29. Similarly, the winch 18 is a means for the second end 32 of the strap 30 to grip the tree bearing structure. In addition, the winch 18 is rotated in order to increase the tension in the strap 30 between the first end 31 and the second end 32, which tightens the bind of the strap 30 around the fallen tree. In other embodiment of the present invention, the strap 30 could be replaced with a come-a-long, rope, or any similar tensioning device.

Figure 5:
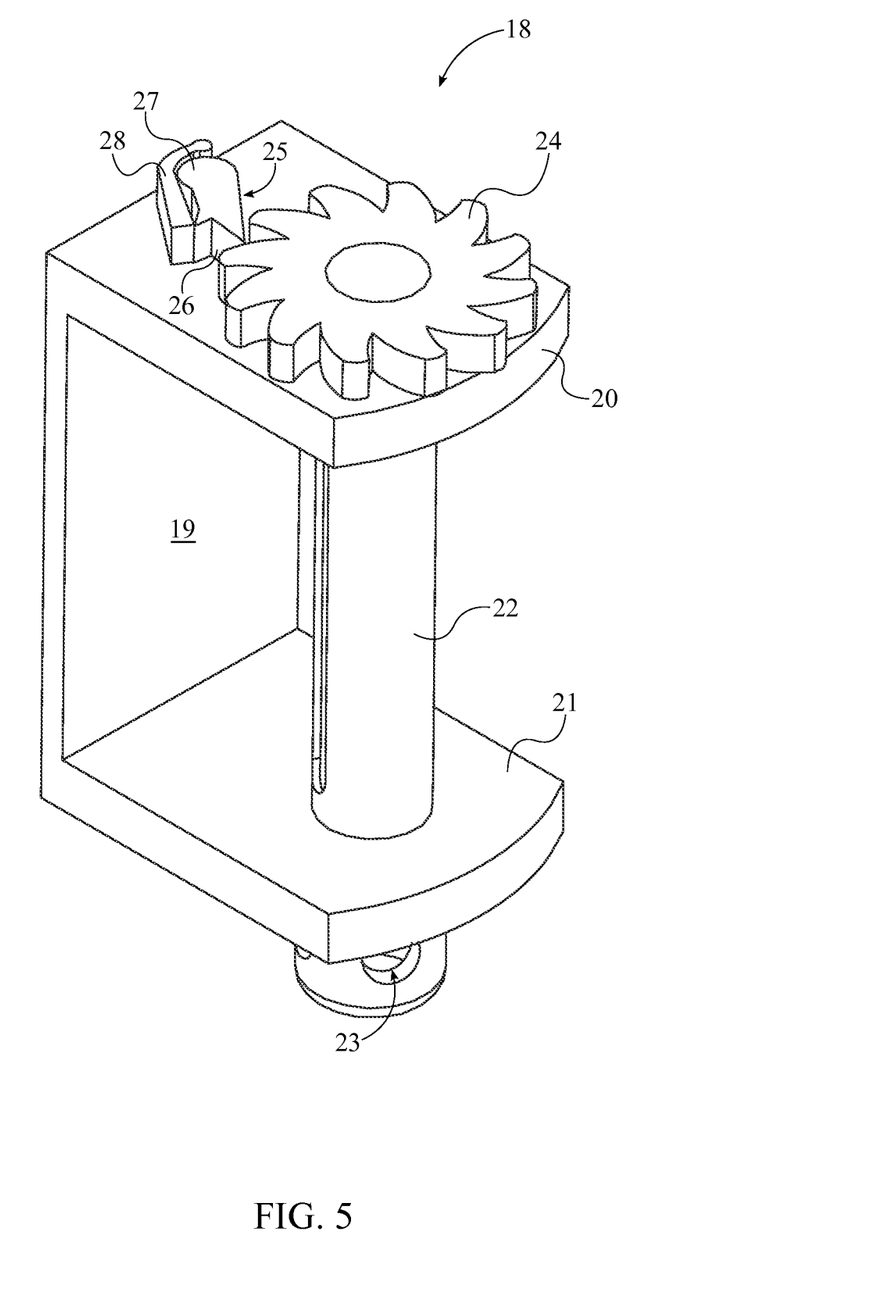
FIG. 5 is a perspective view of the winch for the present invention.

For the present invention, the winch 18 had a particular configuration, which is illustrated in FIG. 5. The winch 18 comprises a base 19, a slotted spool 22, a crank engagement point 23, a ratchet wheel 24, a pawl 25, and a backing 28. The base 19 is the structural component of the winch 18 that connects to the tree bearing structure and comprises a top leg 20 and a bottom leg 21. The top leg 20 and the bottom leg 21 are positioned opposite to each other through said base 19 and are positioned parallel to each other so that the top leg 20 and the bottom leg 21 can evenly distribute the axial load of the slotted spool 22. Thus, the slotted spool 22 is rotatably connected to the base 19 by traversing through the top leg 20 and the bottom leg 21. The slotted spool 22 is actually where the second end 32 of the strap 30 engages the winch 18. The ratchet wheel 24 and the pawl 25 allow the winch 18 to slowly tighten the strap 30 by incrementally rotating the ratchet wheel 24. The ratchet wheel 24 is concentrically connected to the slotted spool 22 above the top leg 20, and the crank engagement point 23 is positioned on the slotted spool 22 below the bottom leg 21. The crank engagement point 23 allows a mechanical crank to be attached to the slotted spool 22 so that the slotted spool 22 and the ratchet wheel 24 can be incrementally rotated by the mechanical crank. The pawl 25 allows the ratchet wheel 24 to rotate in the direction that tightens the strap 30 and prevents the ratchet wheel 24 from rotating in the direction that loosens the strap 30. The pawl 25 comprises a locking end 26 and a pivoting end 27. The locking end 26 engages the ratchet wheel 24 and prevents the ratchet wheel 24 from rotating in the direction that loosens the strap 30. The pivoting end 27 allows the locking end 26 to disengage from the ratchet wheel 24 while the ratchet wheel 24 is rotating in the direction that tightens the strap 30. The pivoting end 27 is rotatably connected to the top leg 20 adjacent to the ratchet wheel 24. The backing 28 is a piece of material that braces the pivoting end 27 of the pawl 25 while the locking end 26 is engaged to the ratchet wheel 24. Consequently, the backing 28 is adjacently positioned against the pivoting end 27 opposite to the ratchet wheel 24 and is connected onto the top leg 20. In other embodiments of present invention, each securing assembly 17 could use a ratcheting strap.

As can be seen in FIGS. 1, 2, and 3, the plurality of brackets 14 extends the bracing ability of the trunk cradle 1 and the stump cradle 3. Each of the plurality of brackets 14 comprises a left portion 15 and a right portion 16, which are used to increase the circular bracing arc of the trunk cradle 1 and the stump cradle 3. Thus, the left portion 15 is adjacently connected to the tree bearing structure, and the right portion 16 is adjacently connected to the tree bearing structure opposite to the left portion 15. In addition, the left portion 15 and the right portion 16 protrude out of the tree bearing structure away from the ground support 5, the at least one counterfort 4, and the actuator 6.

Figure 4A:
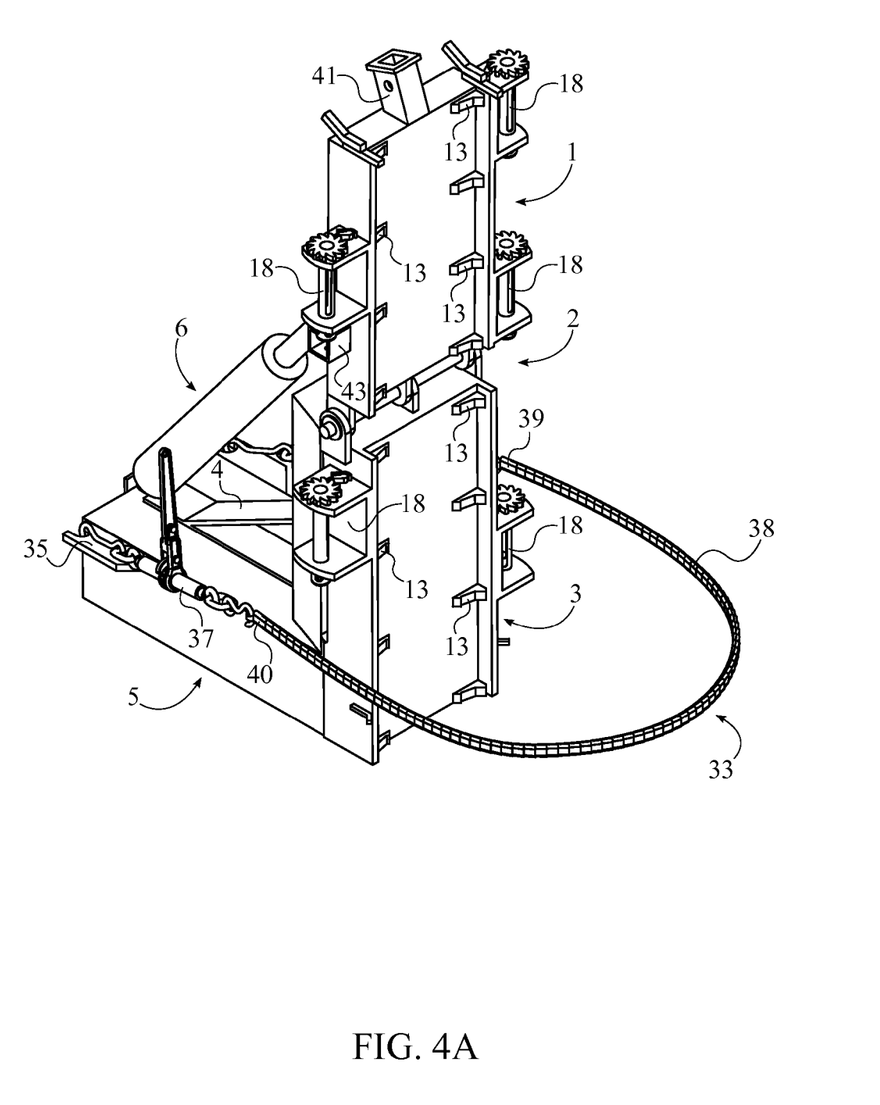
FIG. 4A is a right-side perspective view of the present invention with the chain.
Figure 4B:
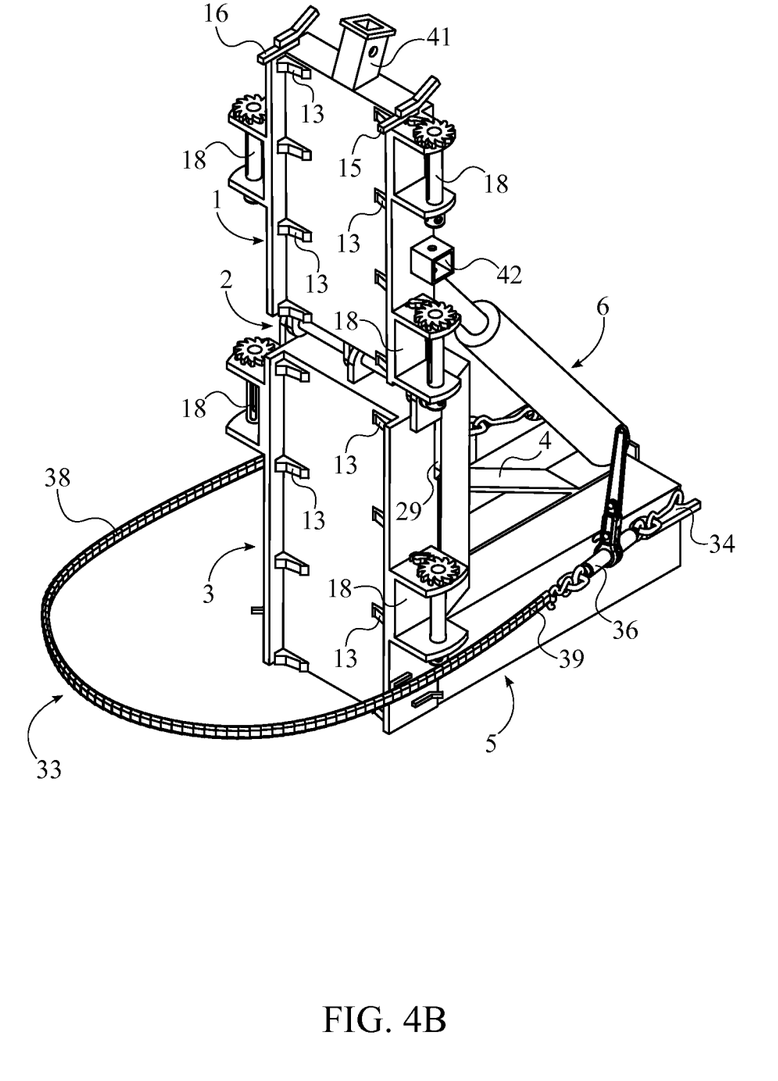
FIG. 4B is a left-side perspective view of the present invention with the chain.

The present invention is relatively large in size and weight, which makes the present invention difficult to maneuver in tight spaces around the fallen tree. The positioning mechanism 33 is used to incrementally move the present invention closer to the felled tree once the present invention is positioned in the general vicinity of the felled tree. As can be seen in FIGS. 4A and 4B, the positioning mechanism 33 comprises a left hook 34, a right hook 35, a left ratcheting chain binder 36, a right ratcheting chain binder 37, and a chain 38. The chain 38 is positioned around the rooted portion of the felled tree and is used to pull the present invention towards the felled tree. The chain 38 comprises a left end 39 and a right end 40, which are positioned opposite to each other along the chain 38. The left hook 34 and the right hook 35 allow the chain 38 to attach to the ground support 5. The left hook 34 is perpendicularly connected to the ground support 5, and the right hook 35 is perpendicularly connected to the ground support 5 opposite to the left hook 34. The left hook 34 and the right hook 35 are positioned opposite the stump cradle 3 along the ground support 5, which provides the left ratcheting chain binder 36 and the right ratcheting chain binder 37 enough room to operate. The left ratcheting chain binder 36 and the right ratcheting chain binder 37 increase and decrease in length by rotating a crank, which allows the present invention to be pulled towards the felled tree. Consequently, the left end 39 of the chain 38 is linked to the left hook 34 by the left ratcheting chain binder 36, and the right end 40 of the chain 38 is linked to the right hook 35 by the right ratcheting chain binder 37.

Figure 7:
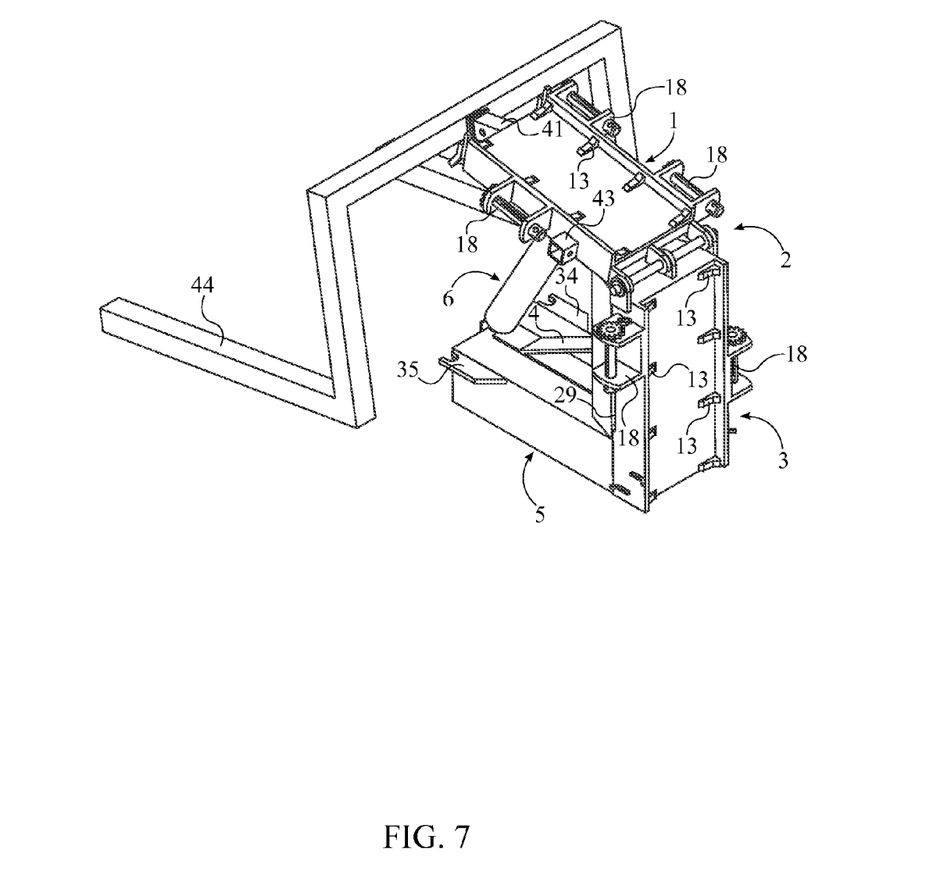
FIG. 7 is a perspective view of the present invention with the fork lowered.
Figure 8:
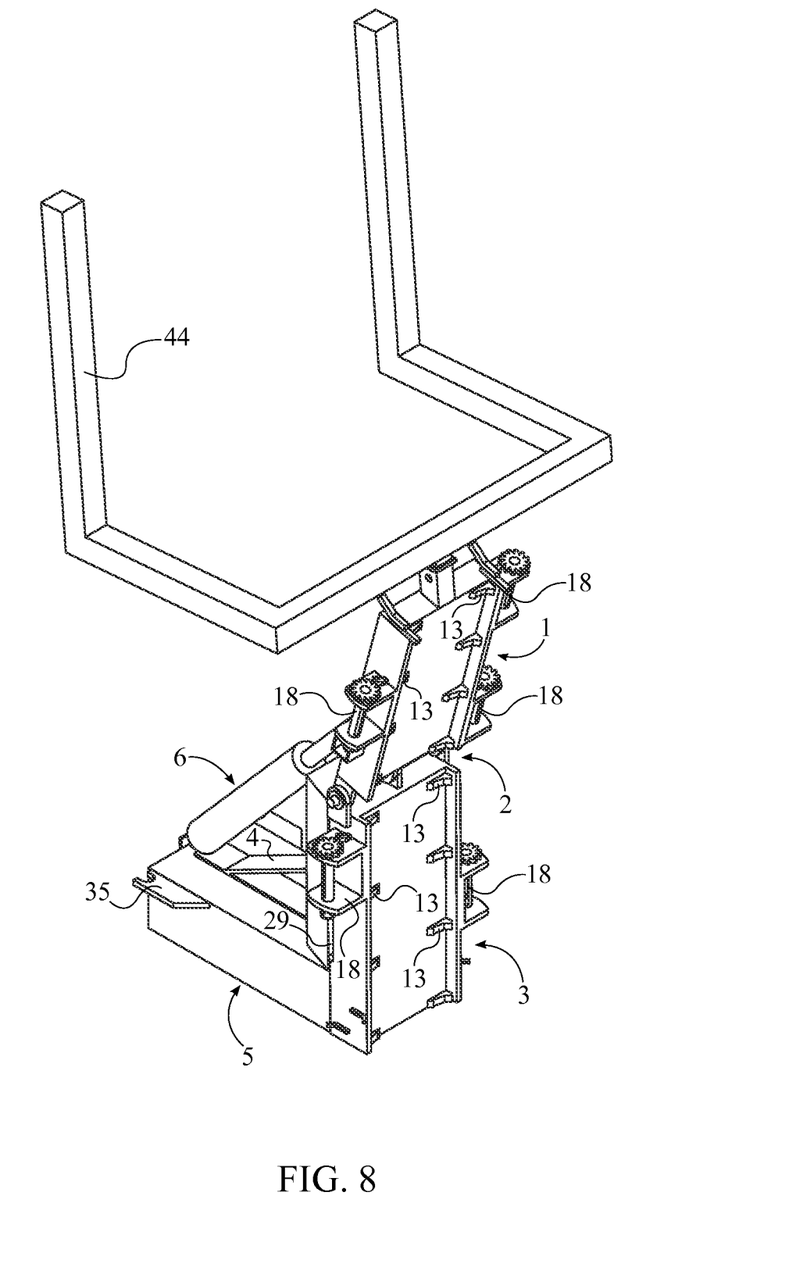
FIG. 8 is a perspective view of the present invention with the fork raised.
Figure 10:
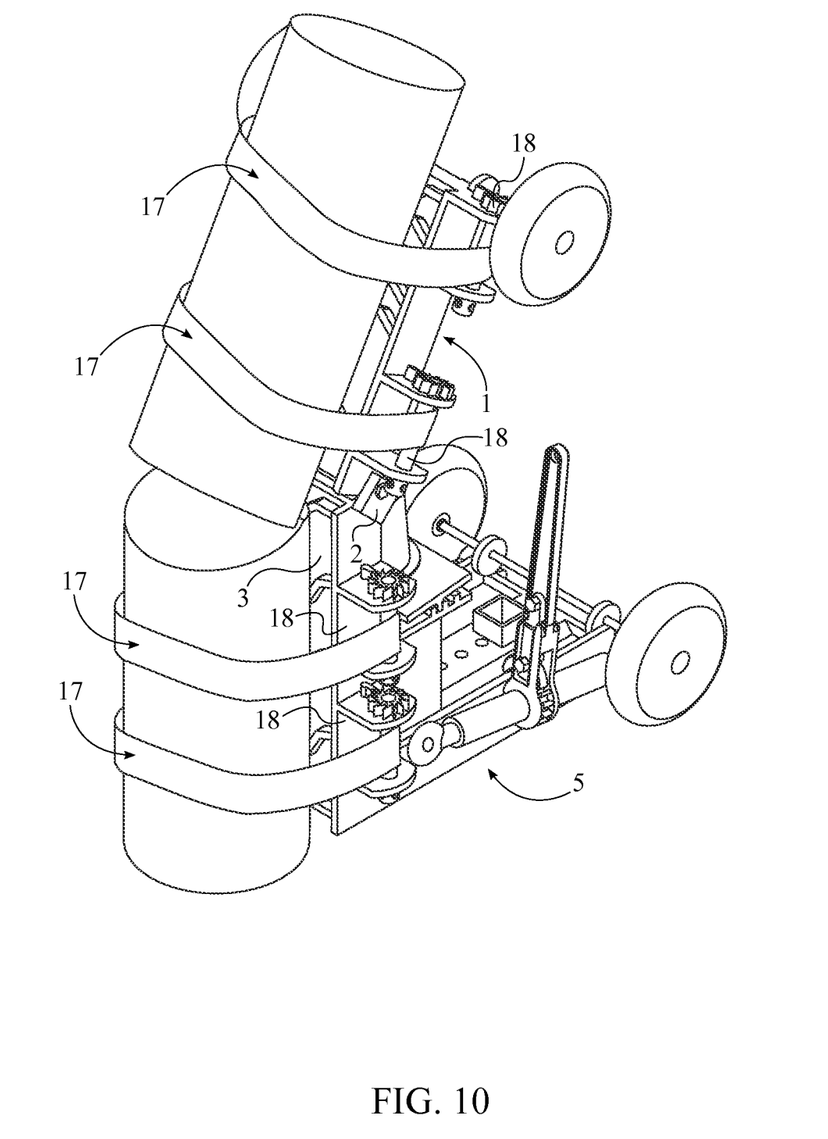
FIG. 10 is a perspective view of a different embodiment of the present invention breaking a felled tree.
Figure 11:
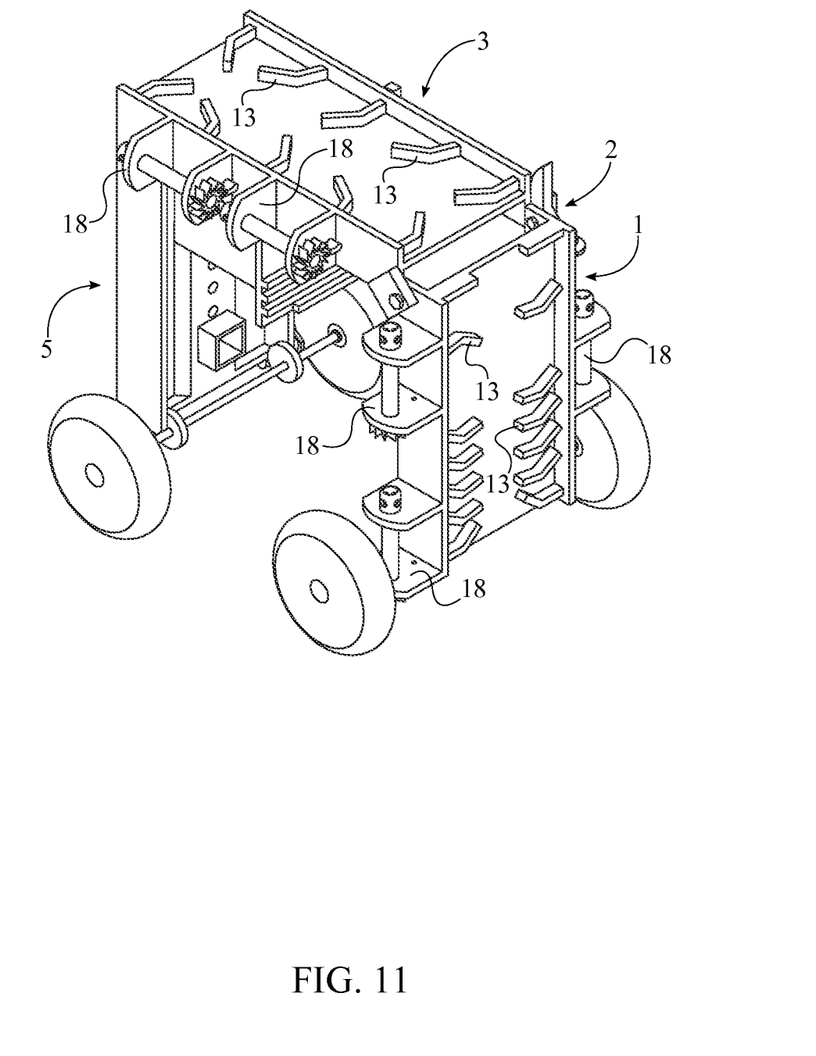
FIG. 11 is a perspective view of a different embodiment of the present invention in rolling configuration with two wheel assemblies.

The top square hitch 41, the left square hitch 42, and the right square hitch 43 are used to attach the present invention to a stump grinder and carry the present invention with the stump grinder. These hitches are positioned on different locations on the present invention so that the present invention can be carried in different orientations. Thus, the top square hitch 41 is adjacently connected to the trunk cradle 1 opposite to the notch hinge 2. Once the actuator 6 pulls the trunk cradle 1 to be parallel to the ground support 5, the stump grinder can attach and carry the present invention by the top square hitch 41. The left square hitch 42 and the right square hitch 43 are positioned in between the top square hitch 41 and the notch hinge 2. The left square hitch 42 is adjacently connected to the trunk cradle 1, and the right square hitch 43 is adjacently connected to the trunk cradle 1 opposite to the left square hitch 42 so that the stump grinder can attach and carry the present invention from either the left or the right. In addition, the present invention can further comprise a three point pitch fork, which can be used to lift logs of felled tree onto the bed of truck so that the section of felled tree can be removed from that location. The three point pallet fork 44 is attached to the trunk cradle 1 by the top square hitch 41 while the actuator 6 is in the compressed state, which is depicted in FIG. 7. A log of the felled tree is loaded onto the three point pallet fork 44, and the actuator 6 extends in the elongated state, which lifts the section of the felled tree above the bed of the truck. The log of the felled tree can then be rolled off the three point pallet fork 44 and onto the bed of the truck. The three point pallet fork 44 can be used to load a log that weight a 1000 pounds onto a truck bed. Furthermore, the present invention can additional comprise a first wheel assembly attached to ground support 5 and a second wheel assembly attached to the trunk cradle 1, which is illustrated in FIG. 10. If the trunk cradle 1 is made to be parallel to the ground support 5, the present invention can be rolled with the first wheel assembly and the second wheel assembly as can be seen in FIG. 11.

Although the invention has been explained in relation to its preferred embodiment, it is to be understood that many other possible modifications and variations can be made without departing from the spirit and scope of the invention as hereinafter claimed.

The invention claimed is:

1. A portable directional tree feller comprises,
   a trunk cradle;
   a notch hinge;
   a stump cradle;
   an at least one counterfort;
   a ground support;
   an actuator;
   a plurality of tree cleats;
   a plurality of brackets;
   a plurality of securing assemblies;
   a positioning mechanism;
   a top square hitch;
   a left square hitch;
   a right square hitch;
   said actuator comprises a chamber and a piston;
   each of said plurality of brackets comprises a left portion and a right portion;
   each of said plurality of securing assemblies comprises a winch, a ledge, and a strap; and
   said positioning mechanism comprises a left hook, a right hook, a left ratcheting chain binder, a right ratcheting chain binder, and a chain.

2. The portable directional tree feller as claimed in claim 1 comprises,
   said trunk cradle being adjacently positioned to said stump cradle;
   said notch hinge being positioned in between said trunk cradle and said stump cradle;
   said trunk cradle being pivotally connected to said stump cradle by said notch hinge;
   said ground support being adjacently positioned to said stump cradle opposite to said trunk cradle;
   said ground support being perpendicularly connected to said stump cradle;
   said at least one counterfort being diagonally connected between said stump cradle and said ground support; and
   said actuator being diagonally positioned between said trunk cradle and said ground support.

3. The portable directional tree feller as claimed in claim 2 comprises,
   said chamber comprises an open end and a closed end;
   said open end and said closed end being positioned opposite to each other along said chamber;
   said closed end being pivotally connected to said ground support opposite to said stump cradle;
   said piston comprises a head and a shaft;
   said shaft being connected normal to said head and being centrally positioned with said head;
   said head and said shaft traversing into said chamber through said open end; and said trunk cradle being pivotally connected to said shaft opposite to said head.

4. The portable directional tree feller as claimed in claim 1 comprises,
said trunk cradle and said stump cradle forming a tree bearing structure;
said plurality of securing assemblies being evenly distributed along said tree bearing structure;
said plurality of brackets being evenly distributed along said tree bearing structure; and
said plurality of tree cleats being adjacently connected across said tree bearing structure opposite to said ground support, said at least one counterfort, and said actuator.

5. The portable directional tree feller as claimed in claim 4 comprises,
said strap comprises a first end and a second end;
said ledge being adjacently positioned into said tree bearing structure;
said ledge being engaged by said first end;
said winch being adjacently connected to said tree bearing structure opposite to said ledge; and
said winch being engaged by said second end.

6. The portable directional tree feller as claimed in claim 4 comprises,
said left portion being adjacently connected to said tree bearing structure;
said right portion being adjacently connected to said tree bearing structure opposite to said left portion; and
said left portion and said right portion protruding out of said tree bearing structure away from said ground support, said at least one counterfort, and said actuator.

7. The portable directional tree feller as claimed in claim 1 comprises,
said winch comprises a base, a slotted spool, a crank engagement point, a ratchet wheel, a pawl, and a backing;
said base comprises a top leg and a bottom leg;
said pawl comprises a locking end and a pivoting end;
said top leg and said bottom leg being positioned opposite to each other through said base;
said top leg and said bottom leg being positioned parallel to each other;
said slotted spool being rotatably connected to said base by traversing through said top leg and said bottom leg;
said ratchet wheel being concentrically connected to said slotted spool above said top leg;
said crank engagement point being positioned on said slotted spool below said bottom leg;
said locking end being engaged to said ratchet wheel;
said pivoting end being rotatably connected to said top leg adjacent to said ratchet wheel;
said backing being adjacently positioned against said pivoting end opposite to said ratchet wheel; and
said backing being connected onto said top leg.

8. The portable directional tree feller as claimed in claim 1 comprises,
said chain comprises a left end and a right end;
said left end and said right end being positioned opposite to each other through said chain;
said left hook and right hook being positioned opposite to said stump cradle along said ground support;
said left hook being perpendicularly connected to said ground support;
said right hook being perpendicularly connected to said ground support opposite to said left hook;
said left end being linked to said left hook by said left ratcheting chain binder; and
said right end being linked to said right hook by said right ratcheting chain binder.

9. The portable directional tree feller as claimed in claim 1 comprises,
said top square hitch being adjacently connected to said trunk cradle opposite to said notch hinge;
said left square hitch and said right square hitch being positioned in between said top square hitch and said notch hinge;
said left square hitch being adjacently connected to said trunk cradle; and
said right square hitch being adjacently connected to said trunk cradle opposite to said left square hitch.

10. The portable directional tree feller as claimed in claim 1 comprises,
a three point pallet fork; and
said three point pallet fork being connected to said trunk cradle by said top square hitch.

11. A portable directional tree feller comprises,
a trunk cradle;
a notch hinge;
a stump cradle;
an at least one counterfort;
a ground support;
an actuator;
a plurality of tree cleats;
a plurality of brackets;
a plurality of securing assemblies;
a positioning mechanism;
a top square hitch;
a left square hitch;
a right square hitch;
said actuator comprises a chamber and a piston;
each of said plurality of brackets comprises a left portion and a right portion;
each of said plurality of securing assemblies comprises a winch, a ledge, and a strap;
said positioning mechanism comprises a left hook, a right hook, a left ratcheting chain binder, a right ratcheting chain binder, and a chain;
said trunk cradle being adjacently positioned to said stump cradle;
said notch hinge being positioned in between said trunk cradle and said stump cradle;
said trunk cradle being pivotally connected to said stump cradle by said notch hinge;
said ground support being adjacently positioned to said stump cradle opposite to said trunk cradle;
said ground support being perpendicularly connected to said stump cradle;
said at least one counterfort being diagonally connected between said stump cradle and said ground support;
said actuator being diagonally positioned between said trunk cradle and said ground support;
said trunk cradle and said stump cradle forming a tree bearing structure;
said plurality of securing assemblies being evenly distributed along said tree bearing structure;
said plurality of brackets being evenly distributed along said tree bearing structure; and
said plurality of tree cleats being adjacently connected across said tree bearing structure opposite to said ground support, said at least one counterfort, and said actuator.

12. The portable directional tree feller as claimed in claim 11 comprises,
  said chamber comprises an open end and a closed end;
  said open end and said closed end being positioned opposite to each other along said chamber;
  said closed end being pivotally connected to said ground support opposite to said stump cradle;
  said piston comprises a head and a shaft;
  said shaft being connected normal to said head and being centrally positioned with said head;
  said head and said shaft traversing into said chamber through said open end; and
  said trunk cradle being pivotally connected to said shaft opposite to said head.

13. The portable directional tree feller as claimed in claim 11 comprises,
  said strap comprises a first end and a second end;
  said ledge being adjacently positioned into said tree bearing structure;
  said ledge being engaged by said first end;
  said winch being adjacently connected to said tree bearing structure opposite to said ledge;
  said winch being engaged by said second end;
  said left portion being adjacently connected to said tree bearing structure;
  said right portion being adjacently connected to said tree bearing structure opposite to said left portion; and
  said left portion and said right portion protruding out of said tree bearing structure away from said ground support, said at least one counterfort, and said actuator.

14. The portable directional tree feller as claimed in claim 11 comprises,
  said winch comprises a base, a slotted spool, a crank engagement point, a ratchet wheel, a pawl, and a backing;
  said base comprises a top leg and a bottom leg;
  said pawl comprises a locking end and a pivoting end;
  said top leg and said bottom leg being positioned opposite to each other through said base;
  said top leg and said bottom leg being positioned parallel to each other;
  said slotted spool being rotatably connected to said base by traversing through said top leg and said bottom leg;
  said ratchet wheel being concentrically connected to said slotted spool above said top leg;
  said crank engagement point being positioned on said slotted spool below said bottom leg;
  said locking end being engaged to said ratchet wheel;
  said pivoting end being rotatably connected to said top leg adjacent to said ratchet wheel;
  said backing being adjacently positioned against said pivoting end opposite to said ratchet wheel;
  said backing being connected onto said top leg;
  said chain comprises a left end and a right end;
  said left end and said right end being positioned opposite to each other through said chain;
  said left hook and right hook being positioned opposite to said stump cradle along said ground support;
  said left hook being perpendicularly connected to said ground support;
  said right hook being perpendicularly connected to said ground support opposite to said left hook;
  said left end being linked to said left hook by said left ratcheting chain binder; and
  said right end being linked to said right hook by said right ratcheting chain binder.

15. The portable directional tree feller as claimed in claim 11 comprises,
  said top square hitch being adjacently connected to said trunk cradle opposite to said notch hinge;
  said left square hitch and said right square hitch being positioned in between said top square hitch and said notch hinge;
  said left square hitch being adjacently connected to said trunk cradle;
  said right square hitch being adjacently connected to said trunk cradle opposite to said left square hitch;
  a three point pallet fork; and
  said three point pallet fork being connected to said trunk cradle by said top square hitch.

16. A portable directional tree feller comprises,
  a trunk cradle;
  a notch hinge;
  a stump cradle;
  an at least one counterfort;
  a ground support;
  an actuator;
  a plurality of tree cleats;
  a plurality of brackets;
  a plurality of securing assemblies;
  a positioning mechanism;
  a top square hitch;
  a left square hitch;
  a right square hitch;
  said actuator comprises a chamber and a piston;
  each of said plurality of brackets comprises a left portion and a right portion;
  each of said plurality of securing assemblies comprises a winch, a ledge, and a strap;
  said positioning mechanism comprises a left hook, a right hook, a left ratcheting chain binder, a right ratcheting chain binder, and a chain;
  said trunk cradle being adjacently positioned to said stump cradle;
  said notch hinge being positioned in between said trunk cradle and said stump cradle;
  said trunk cradle being pivotally connected to said stump cradle by said notch hinge;
  said ground support being adjacently positioned to said stump cradle opposite to said trunk cradle;
  said ground support being perpendicularly connected to said stump cradle;
  said at least one counterfort being diagonally connected between said stump cradle and said ground support;
  said actuator being diagonally positioned between said trunk cradle and said ground support;
  said trunk cradle and said stump cradle forming a tree bearing structure;
  said plurality of securing assemblies being evenly distributed along said tree bearing structure;
  said plurality of brackets being evenly distributed along said tree bearing structure; and
  said plurality of tree cleats being adjacently connected across said tree bearing structure opposite to said ground support, said at least one counterfort, and said actuator;
  said top square hitch being adjacently connected to said trunk cradle opposite to said notch hinge;
  said left square hitch and said right square hitch being positioned in between said top square hitch and said notch hinge;
  said left square hitch being adjacently connected to said trunk cradle;

said right square hitch being adjacently connected to said trunk cradle opposite to said left square hitch;
a three point pallet fork; and
said three point pallet fork being connected to said trunk cradle by said top square hitch.

17. The portable directional tree feller as claimed in claim 16 comprises,
said chamber comprises an open end and a closed end;
said open end and said closed end being positioned opposite to each other along said chamber;
said closed end being pivotally connected to said ground support opposite to said stump cradle;
said piston comprises a head and a shaft;
said shaft being connected normal to said head and being centrally positioned with said head;
said head and said shaft traversing into said chamber through said open end; and
said trunk cradle being pivotally connected to said shaft opposite to said head.

18. The portable directional tree feller as claimed in claim 16 comprises,
said strap comprises a first end and a second end;
said ledge being adjacently positioned into said tree bearing structure;
said ledge being engaged by said first end;
said winch being adjacently connected to said tree bearing structure opposite to said ledge;
said winch being engaged by said second end;
said winch comprises a base, a slotted spool, a crank engagement point, a ratchet wheel, a pawl, and a backing;
said base comprises a top leg and a bottom leg;
said pawl comprises a locking end and a pivoting end;
said top leg and said bottom leg being positioned opposite to each other through said base;
said top leg and said bottom leg being positioned parallel to each other;
said slotted spool being rotatably connected to said base by traversing through said top leg and said bottom leg;
said ratchet wheel being concentrically connected to said slotted spool above said top leg;
said crank engagement point being positioned on said slotted spool below said bottom leg;
said locking end being engaged to said ratchet wheel;
said pivoting end being rotatably connected to said top leg adjacent to said ratchet wheel;
said backing being adjacently positioned against said pivoting end opposite to said ratchet wheel; and
said backing being connected onto said top leg.

19. The portable directional tree feller as claimed in claim 16 comprises,
said left portion being adjacently connected to said tree bearing structure;
said right portion being adjacently connected to said tree bearing structure opposite to said left portion;
said left portion and said right portion protruding out of said tree bearing structure away from said ground support, said at least one counterfort, and said actuator;
said chain comprises a left end and a right end;
said left end and said right end being positioned opposite to each other through said chain;
said left hook and right hook being positioned opposite to said stump cradle along said ground support;
said left hook being perpendicularly connected to said ground support;
said right hook being perpendicularly connected to said ground support opposite to said left hook;
said left end being linked to said left hook by said left ratcheting chain binder; and
said right end being linked to said right hook by said right ratcheting chain binder.

* * * * *